United States Patent
Weersink

(10) Patent No.: US 9,358,905 B2
(45) Date of Patent: Jun. 7, 2016

(54) HYDRAULIC CHAIR LIFT

(71) Applicant: Anne Marie Emilie Weersink, Enschede (NL)

(72) Inventor: Rene Tarcisius Wiro Weersink, Enschede (NL)

(73) Assignee: Anne Marie Emilie Weersink, Enschede (NL)

( * ) Notice: Subject to any disclaimer, the term of this patent is extended or adjusted under 35 U.S.C. 154(b) by 0 days.

(21) Appl. No.: 13/919,265

(22) Filed: Jun. 17, 2013

(65) Prior Publication Data

US 2013/0334856 A1     Dec. 19, 2013

(30) Foreign Application Priority Data

Jun. 18, 2012 (EP) .................................. 12172412

(51) Int. Cl.
| | |
|---|---|
| *B60P 1/00* | (2006.01) |
| *B60N 2/16* | (2006.01) |
| *A61G 3/06* | (2006.01) |
| *F15B 15/14* | (2006.01) |

(52) U.S. Cl.
CPC .............. *B60N 2/1665* (2013.01); *A61G 3/062* (2013.01); *F15B 15/1433* (2013.01)

(58) Field of Classification Search
CPC ....................................................... A61G 3/02
USPC ............................................. 254/93 R, 89 H
See application file for complete search history.

(56) References Cited

U.S. PATENT DOCUMENTS

| | | | |
|---|---|---|---|
| 2,645,513 A |   | 7/1953 | Sterrett |
| 5,149,246 A | * | 9/1992 | Dorn ............................ 414/541 |
| 6,581,913 B1 | * | 6/2003 | Conomos et al. ......... 254/133 R |
| 2005/0035338 A1 | * | 2/2005 | Panzarella et al. ............ 254/390 |
| 2007/0186765 A1 |   | 8/2007 | Westendorf et al. |

FOREIGN PATENT DOCUMENTS

| | | |
|---|---|---|
| DE | 8815282 U1 | 2/1989 |
| DE | 202007014684 U1 | 1/2008 |

OTHER PUBLICATIONS

Extended European Search Report issued in European Application No. 12172412.4, mailed on Nov. 15, 2012 (7 pages).

* cited by examiner

*Primary Examiner* — Saul Rodriguez
*Assistant Examiner* — Willie Berry, Jr.
(74) *Attorney, Agent, or Firm* — Osha Liang LLP

(57) ABSTRACT

A hydraulic chair lift in a vehicle includes a rod that is attached to the floor and the roof of the vehicle, a piston that is arranged around the rod in a middle zone of the rod, a barrel that envelopes the piston, and two heads, each of which is arranged on an end of the barrel. Further, the two heads are provided with a channel for the passage of the rod. Additionally, a rod gland is arranged in each of the two heads surrounding the channel. Relative to the rod gland, the channel includes a first inner channel part with a first diameter and a second inner channel part with second diameter. The first diameter is smaller than the second diameter and the ratio of the length and the diameter of the first channel part is less than 3/5.

11 Claims, 2 Drawing Sheets

HYDRAULIC CHAIR LIFT

CROSS REFERENCE TO RELATED APPLICATION

This application claims the benefit of European Patent Application No. 12172412.4 entitled "Hydraulic Chair Lift" filed Jun. 18, 2012, which is hereby incorporated by reference in its entirety.

BACKGROUND OF THE INVENTION

1. Field of the Invention

The present invention relates to a hydraulic chair lift for arrangement in a vehicle, like a car or a van, which hydraulic chair lift includes a rod with attachment means on both ends for attachment with the floor and the roof zone of the vehicle; a piston arranged around the rod in a middle zone of the rod; a barrel enveloping the piston; and two heads arranged on each end of the barrel, which heads are provided with a channel for passage of the rod, wherein a rod gland is arranged in the head surrounding the channel.

2. Description of Related Art

Such chair lifts are mounted in vehicles to assist in lifting disabled people in and out the vehicle. A chair frame is mounted to the barrel and by feeding hydraulic oil on either side of the piston the chair frame can be brought up or let down. The vehicle chair or a separate chair is lifted and the chair frame is then rotated around the rod to bring the chair outside the vehicle, after which the lift is let down to bring the chair down on the street. Wheels can for example be mounted to the chair, such that it can be used as a wheel chair. To lift someone into the vehicle, the reverse process is performed.

Using a hydraulic cylinder as a chair lift for vehicles gives a large momentum on the hydraulic cylinder. As a result the rod will bent. The bending of the rod will give problems in the heads of the cylinder, which could cause leakage or heavy rotation.

Typically, a person skilled in the art would add additional sealings to the rod gland, to avoid leakage in such applications. The rod gland often has also another seal called a rod wiper which prevents contaminants from entering the cylinder when the extended rod retracts back into the cylinder.

However, with a chair lift according to the preamble, it is also necessary to rotate the chair around the rod. When additional sealings are added, the friction in the heads will increase, making it more difficult to rotate the chair around the rod by hand.

SUMMARY OF THE INVENTION

It is an object of the present invention to provide a hydraulic chair lift in which the above mentioned disadvantages are reduced or even removed.

This object is achieved with a hydraulic chair lift in which the channel has, relative to the rod gland, a first inner channel part with a first diameter and a second inner channel part with second diameter, wherein the first diameter is smaller than the second diameter and wherein the ratio of the length and the diameter of the first channel part is less than 3/5.

The first inner channel provides a typical linear bearing in the head for the rod. This linear bearing is lubricated with the hydraulic oil in barrel.

A person skilled in the art will typically choose the length of this linear bearing as long as possible and have it run along the remaining length of the head. This will ensure a good support by the linear bearing and a reduction of the pressure on the sealings arranged in the rod gland.

However, with an application according to the invention, the rod will bend such that the rod will contact the linear bearing causing substantial wear and subsequent leakage of oil.

According to the present invention, the length of this linear bearing is reduced, such that a bend rod cannot get jammed in the linear bearing. Because the pressure needed for lifting a chair is small, the pressure drop over the linear bearing is still sufficient for the seals in the rod gland.

The reduction in length of the linear bearing also has a positive effect on the force needed to rotate the chair around the rod.

In a preferred embodiment of the hydraulic chair lift according to the present invention, the ratio of the length and the diameter of the first channel part is 2/5.

This further improves the handling when rotating the chair around the rod and still provides for sufficient bearing and sealing.

In another embodiment of the hydraulic chair lift according to the present invention, a chair frame is mounted to the barrel. This chair frame could be a rigid frame or a telescopic frame, dependent on the vehicle in which the lift is arranged and the desired possibilities.

In still another embodiment of the hydraulic chair lift according to the present invention, the rod gland comprises at least a seal and a rod wiper.

Furthermore, in the hydraulic chair lift according to the present invention, the barrel is provided on both ends with a hydraulic connection for feeding or draining hydraulic fluid.

The chair lift according to the present invention is typically suited for lifting a chair into and out of a car. However, the lift can also be used to lift other objects into and of a car or van. Typically, the lift according to the invention can be used for lifting pallets with goods.

BRIEF DESCRIPTION OF THE DRAWINGS

These and other features of the invention will be elucidated in conjunction with the accompanying drawings.

DETAILED DESCRIPTION OF THE INVENTION

Figure 1:
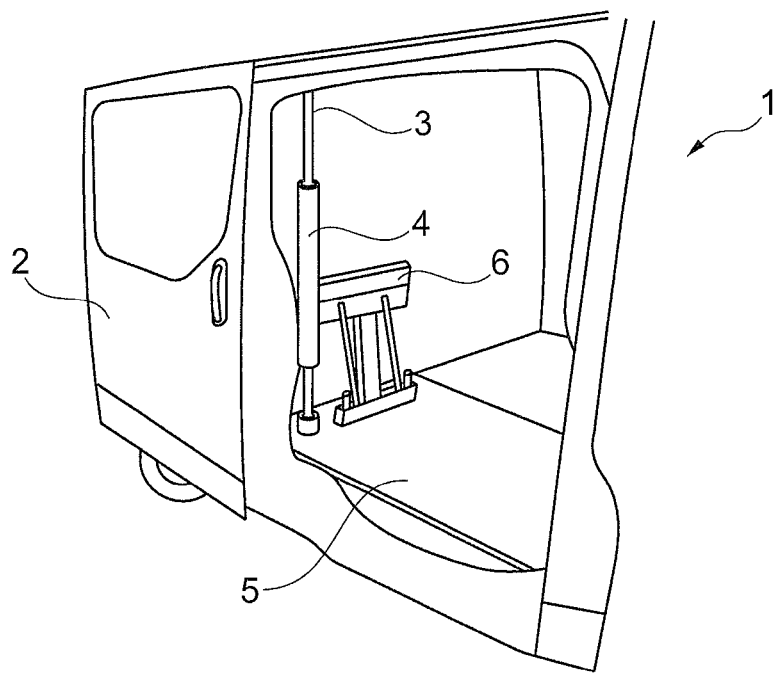
FIG. 1 shows a schematic view of a van with a hydraulic chair lift according to the invention.

FIG. 1 shows a van 1 with a sliding door 2. A hydraulic lift with a rod 3 and barrel 4 is arranged next to the sliding door 2. The rod 3 is arranged between the roof and the bottom 5 of the van 1. Instead of arrangement to the roof, the rod 3 could also be arranged near the roof to a post of the car.

Figure 2:
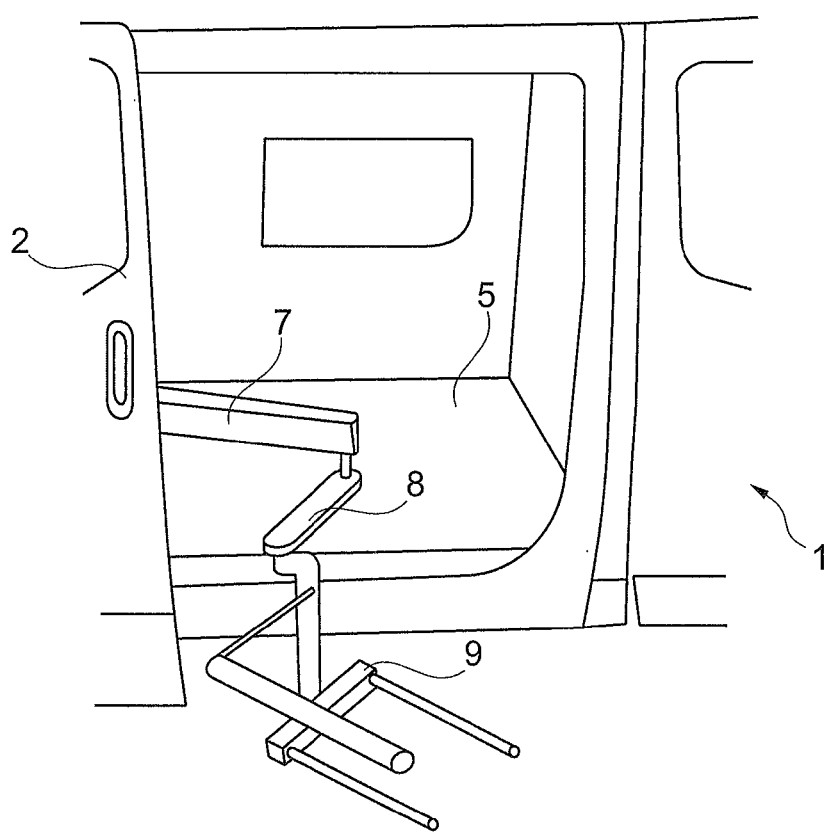
FIG. 2 shows a schematic view of the van of FIG. 1 with the lift extended out.

A chair frame 6 is arranged to the barrel 4. FIG. 2 shows the chair frame 6 rotated outside the van 1. The chair frame has two arms 7, 8 rotatably arranged to each other and a gripper 9 for attachment to a wheel chair.

Figure 3:
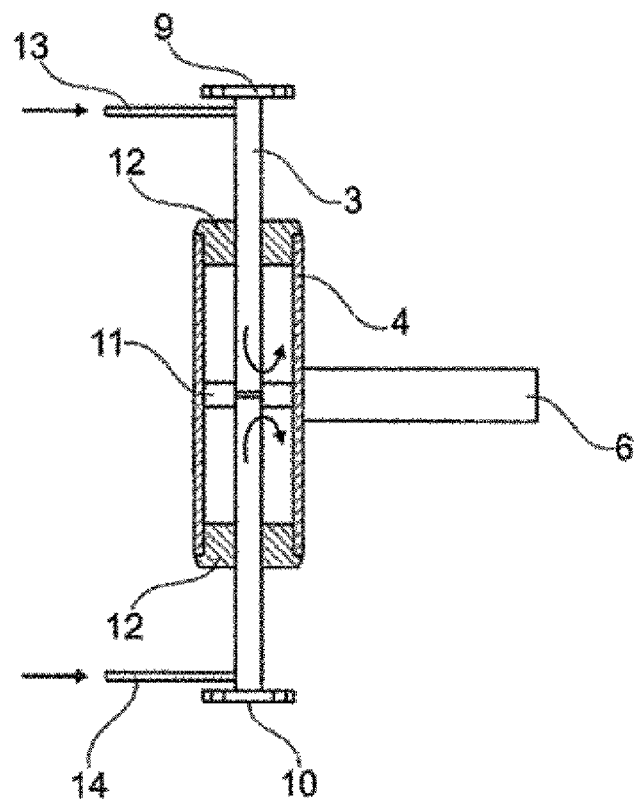
FIG. 3 shows a cross sectional view of the lift of FIG. 1.

FIG. 3 shows the hydraulic lift in cross section. The rod 3 has on both ends a mounting plate 9, 10 for arrangement to the floor 5 and ceiling of the van 1. A piston 11 is arranged at the center of the rod 3. A barrel 4 is arranged around the rod 3 and the piston 11. The barrel 4 is closed on both sides with a head 12, which is shown in more detail in FIG. 4. The chair frame 6 is attached to the barrel 4.

The rod 3 is hollow, such that hydraulic fluid can be fed or discharged at the top 13 or bottom 14 of the rod to fill the barrel 4 and have the chair frame 6 move up or down.

Figure 4:
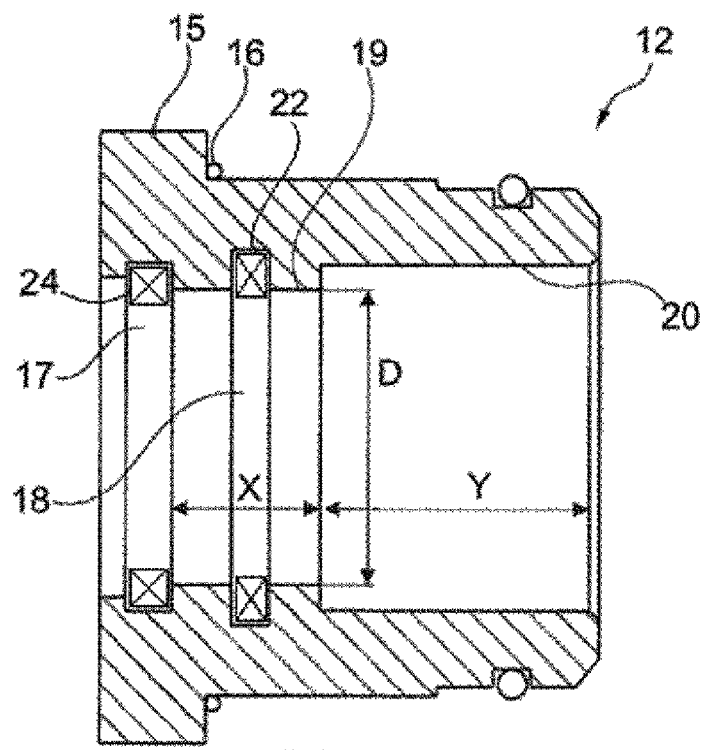
FIG. 4 shows a cross sectional view of a head of the lift of FIG. 3.

FIG. 4 shows a cross sectional view of the head 12. The head 12 is screwed into the barrel 4 and has a flange 15 to limit the insertion of the head 12 in the barrel 4. An O-ring 16 provides for a sealing respective with the barrel 4.

The head 12 has a rod gland having two grooves 17, 18 in which a seal 22 and a scraper 24 can be arranged.

Next to the rod gland 17, 18 a first inner channel part 19 and a second inner channel part 20 is arranged. The second part 20 has a larger diameter than the first part 19.

The first channel part 19 functions as a linear bearing for the rod. Because the length x is relative small with respect to the diameter D, it is ensured, that sufficient sealing is provided, while a low rotation friction is maintained.

Preferably, the ratio x/D is less than 3/5, more preferably less than 2/5.

The invention claimed is:

1. A hydraulic chair lift for arrangement in a vehicle comprising:
    a rod attached to a floor of the vehicle on a first end and a roof zone of the vehicle on a second end;
    a piston arranged around the rod in a middle zone of the rod;
    a barrel enveloping the piston, and
    two heads, wherein a first head is arranged on a first end of the barrel and a second head is arranged on a second end of the barrel, wherein the first head and the second head are each provided with a channel for passage of the rod, and wherein a rod gland that surrounds the channel is arranged in each of the first head and the second head, wherein the channel includes a first inner channel part with a first diameter and a second inner channel part with second diameter, wherein the first diameter is smaller than the second diameter, and wherein the ratio of the length and the diameter of the first channel part is less than 3/5.

2. The hydraulic chair lift according to claim 1, wherein the ratio of the length and the diameter of the first channel part is 2/5.

3. The hydraulic chair lift according to claim 2, wherein a chair frame is mounted to the barrel.

4. The hydraulic chair lift according to claim 2, wherein the rod gland comprises at least a seal and scraper.

5. The hydraulic chair lift according to claim 2, wherein the barrel is provided on both ends with a hydraulic connection for feeding or draining hydraulic fluid.

6. The hydraulic chair lift according to claim 1, wherein a chair frame is mounted to the barrel.

7. The hydraulic chair lift according to claim 6, wherein the rod gland comprises at least a seal and a scraper.

8. The hydraulic chair lift according to claim 6, wherein the barrel is provided on both ends with a hydraulic connection for feeding or draining hydraulic fluid.

9. The hydraulic chair lift according to claim 1, wherein the rod gland comprises at least a seal and a scraper.

10. The hydraulic chair lift according to claim 9, wherein the barrel is provided on both ends with a hydraulic connection for feeding or draining hydraulic fluid.

11. The hydraulic chair lift according to claim 1, wherein the barrel is provided on both ends with a hydraulic connection for feeding or draining hydraulic fluid.

* * * * *